INVENTORS
CARROLL H. VAN HARTESVELDT
BUDDY D. WAHL

BY Olsen and Stephenson
ATTORNEYS

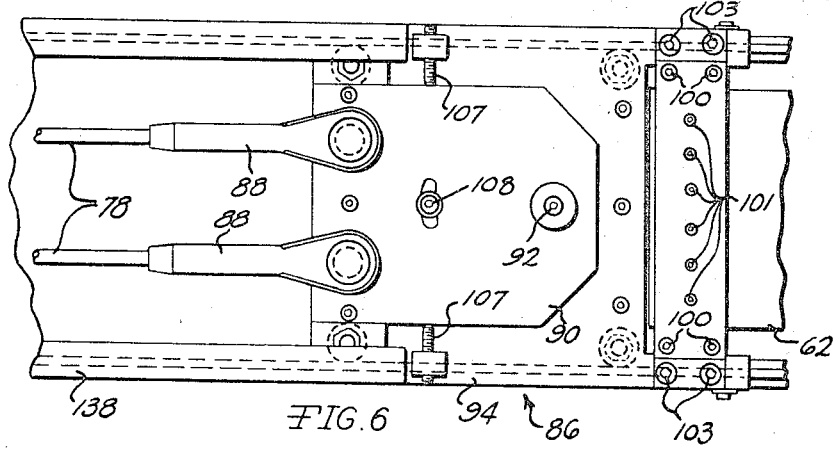
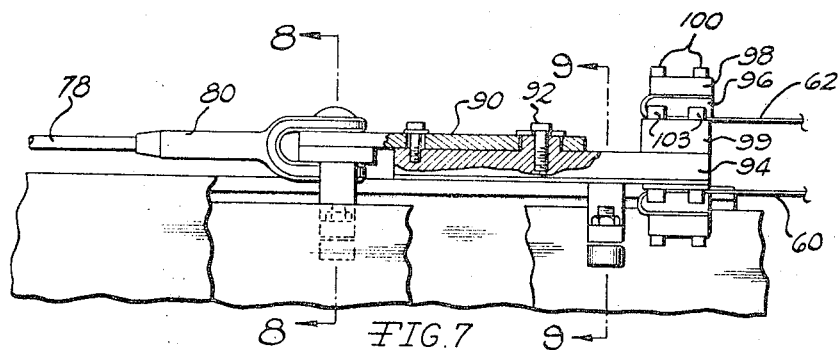
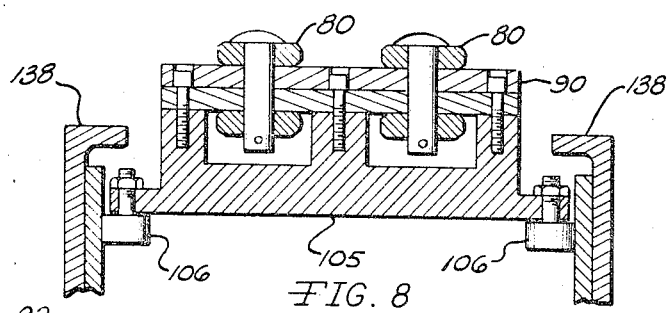
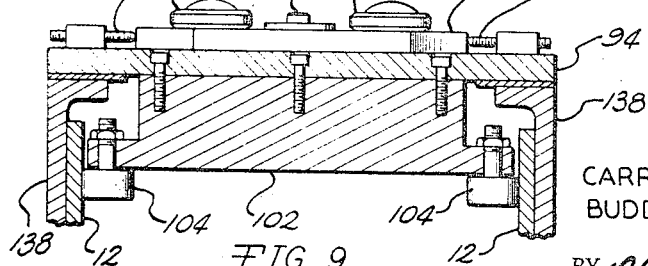
INVENTORS
CARROLL H. VAN HARTESVELDT
BUDDY D. WAHL

United States Patent Office 3,450,032
Patented June 17, 1969

3,450,032
PRESS
Carroll H. Van Hartesveldt, Toledo, Ohio, and Buddy D. Wahl, Ann Arbor, Mich., assignors to Hoover Ball and Bearing Company, Ann Arbor, Mich., a corporation of Michigan
Filed Nov. 14, 1966, Ser. No. 593,994
Int. Cl. B30b *15/34, 5/00;* B02c *11/08*
U.S. Cl. 100—93
16 Claims

ABSTRACT OF THE DISCLOSURE

Apparatus for making workpieces in sheet form wherein such workpieces are sandwiched in between two metallic sheets and such sheets are then pulled between two spaced platens wherein heating and compressing of the workpieces occur.

---

The present invention relates to a press for making workpieces in sheet form, such as wooden products having a hardened compressed layer on the surface, laminated sheet products, and the like. In particular, the present invention is adapted to be used in conjunction with large continuous presses of the type disclosed in United States Letter Patent Nos. 3,207,062 and 3,206,009.

When using large continuous presses of the type shown in the aforesaid patents, it is frequently necessary to conduct tests on workpieces that are to be passed through such presses to determine the various operating parameters that are to be adopted or followed. Thus, it may be desirable or necessary to know in advance the speed at which the continuous belts are to be driven, the temperature at which the platens are to be heated, the type of plastic material that may be required to produce a desired finished product, the extent of cooling of portions of the platens that may be required, and the like. Also, in view of the fact that the physical characteristics of the raw materials that are often used in forming workpieces vary from time-to-time it is also desirable to conduct tests in connection with such changing raw materials without interrupting operation of the continuous presses. The test results can then be used to change the operating parameters of the continuous press, if required, when the new supply of raw material is used. Therefore, it is desirable to have a means to conduct these tests without interrupting the continuous operation of the large press or presses, and it is also desirable to do this so that if damage may occur to the press as a result of conducting the tests, such damage will occur to a small press where the cost will be minimal and where compensation for and correction of the damage can easily be made.

In a continuous press of the type illustrated in the aforesaid patents, there are two elements which are primarily susceptible to damage if the press is improperly used. These two elements are the platens and the continuous belts or sheets which are arranged to be pulled over the surfaces of the platens with a workpiece sandwiched in between the belts. Damage to either of these elements will result in interrupting the operation of the press which will be costly both from the standpoint of the shutdown time of the press as well as the cost of replacing these elements.

Therefore, it is an object of the present invention to provide a press adapted to produce sheet products, and particularly such a press which is adapted to simulate conditions which exist when operating large continuous presses of the type disclosed in the aforesaid patents.

It is another object of the present invention to provide a press of the foregoing character which is constructed and arranged to facilitate changing of the various operating parameters thereof.

It is another object of the present invention to provide a press having two sheets or belts of relatively short length which are adapted to be pulled forward between the platens with a workpiece sandwiched in between, and which are then adapted to be pulled backward to their initial starting position, whereby relatively inexpensive belts, or belts that have been cut from discarded large continuous belts of the type used in continuous presses, may be used.

It is antother object of the present invention to provide a test press of the foregoing character which is constructed and arranged to facilitate feeding workpieces in between the belts for being pulled between the platens, and for removing such workpieces from between the belts after the workpiece has been pulled between the platens.

It is another object of the present invention to provide a test press of the foregoing character which is constructed and arranged so that new segments of belts may readily be used with the press and wherein means are provided to properly align such belts so that they will be pulled uniformly between the platens.

It is another object of the present invention to provide a test press of the foregoing character which has means for pulling the belts between the platens, such means being constructed and arranged to be extensible so that belts of different lengths may readily be used with the press.

In accordance with the present invention, one form of a test press is provided for forming workpieces in sheet form which employs an elongated frame structure supporting at a location between its ends first and second platens having opposed surfaces in spaced-apart relation and first and second belts having a high tensile strength extending in a longitudinal direction of the frame structure and positioned to move over the surface respectively of the first and second platens. Means are provided for pulling the belts in one direction toward the one end of the frame structure with a workpiece sandwiched in between the belts. The means for pulling the belts are connected to one end of each of said belts by a mechanism operable to assure alignment of the belts with the direction of pull of said means and operable to tension the belts substantially equally across the widths of the belts. The means for pulling the belts can also be vertically adjusted relative to the opening between the platens. Other means are provided for pulling the other ends of the belts in the opposite direction toward the other end of the frame structure so that the machine can be used again in connection with another workpiece which is to be passed between the platens. The test press has various means for selectively changing the temperatures of the platens, for varying the spacing between the platens, for varying the speed at which the belts are pulled between the platens, and the like. This means for pulling the belts comprises a hydraulic piston-and-cylinder assembly which is adapted to be connected by cables to the alignment mechanism for pulling the belts in a forward direction between the platens. This same mechanism is also used to pull one of the belts in a reverse direction back through the platens, and other means are provided for returning the second belt to its starting position. The second means merely urges the belt in that direction so that the operator may readily lift the second belt for removing workpieces which have been processed from between the belts.

Other objects of this invention will appear in the following description and appended claims, reference being had to the accompanying drawings forming a part of the specification wherein like reference characters designate corresponding parts in the several views.

In the drawings:

FIGURE 6 is an enlarged fragmentary plan view showing a mechanism of the test press for securing belts properly in place;

FIGURE 7 is a fragmentary side elevation, partially in section of the mechanism shown in FIGURE 6;

FIGURE 8 is a fragmentary section taken on the lines 8—8 of FIGURE 7; and

FIGURE 9 is a fragmentary section taken on the lines 9—9 of FIGURE 7.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
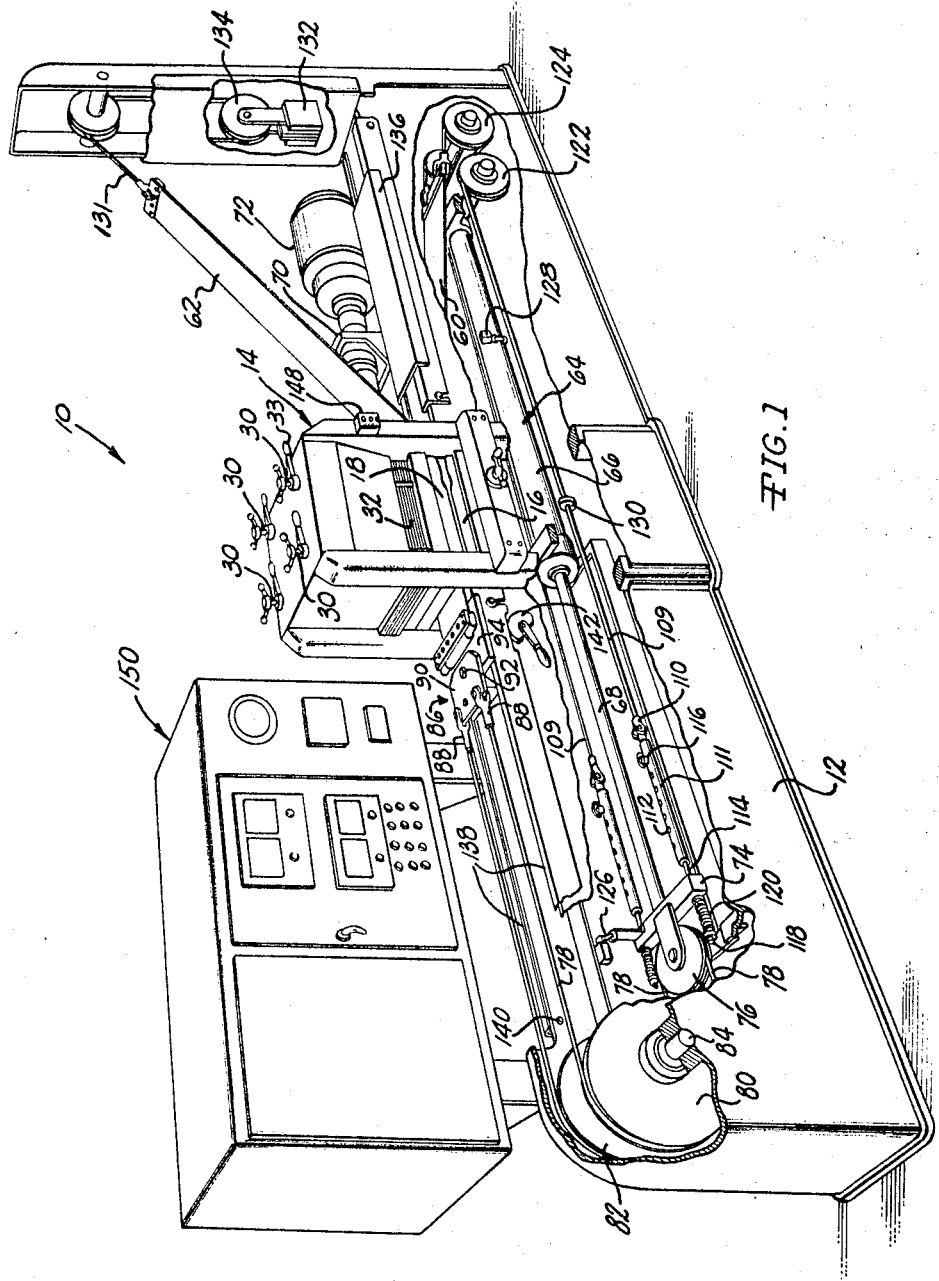
FIGURE 1 is a perspective view of a test press embodying one form of the present invention, with portions of the press cut away to show interior construction.
Figure 2:
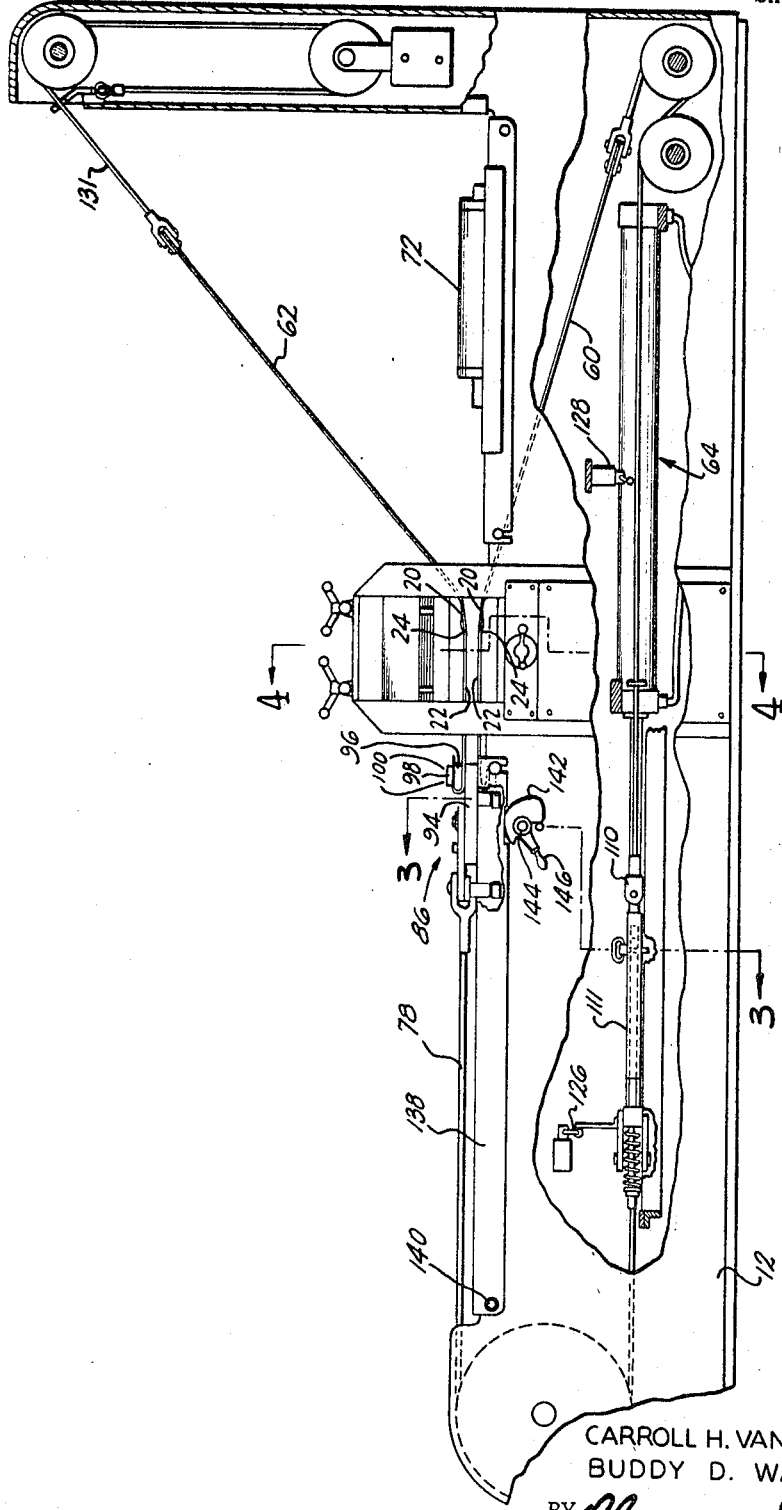
FIGURE 2 is a longitudinal elevational view of the test press shown in FIGURE 1 with portions cut away for purposes of illustration.

Referring now to the drawings, the invention will be described in greater detail. As shown in FIGURES 1 and 2, the test press 10 has an elongated frame structure 12 which supports between its ends the assembly 14. The latter provides a rigid support for the lower platen 16 and the upper platen 18 so that such platens are maintained in spaced-apart relationship. Each of the platens have a surface facing the other platen, and such surfaces include in longitudinal arrangement a first flat surface 20, a second flat surface 22 parallel to the first flat surface 20, and a compression surface 24 inclined inwardly from the first surface 20 to the second surface 22. In addition, each of the platens 16 and 18 contains heating elements and cooling elements, not shown, arranged along the length thereof, and for a more detailed description of one form of platen of this general character which may be used in the present invention, reference is made to the platens illustrated and described in United States Letters Patent No. 3,207,062.

Figure 4:
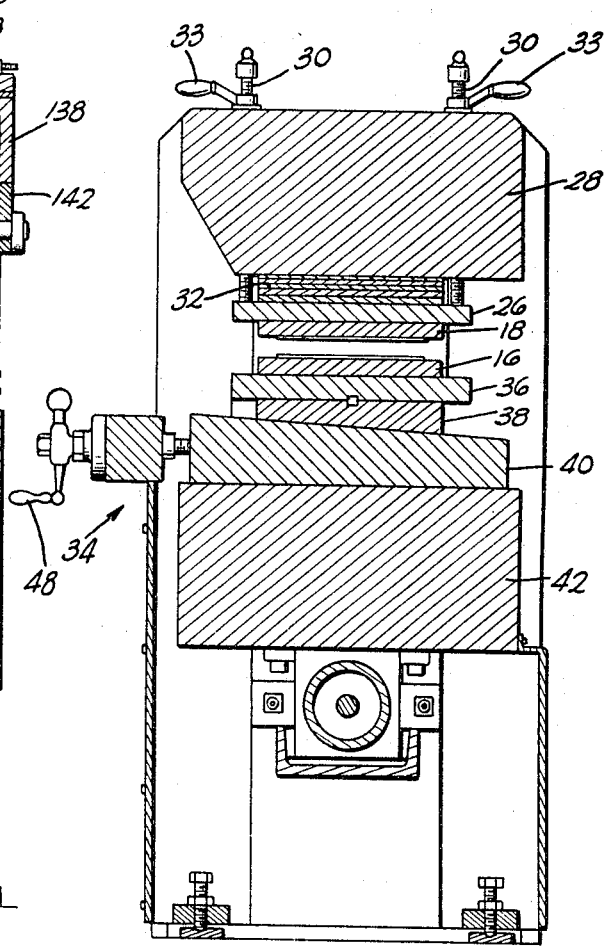
FIGURE 4 is a vertical sectional view taken on the lines 4—4 of FIGURE 2.

Referring to FIGURE 4, it will be observed that the upper platen 18 is secured to a plate 26 which in turn is suspended from the frame member 28 by four screws 30. A plurality of shims 32 are positioned between the frame member 28 and the plate 26 to provide a desired spacing of the supper platen 18 above the lower platen 16. The screws 30 project through the frame member 28 so that the elevation of the plate 26, and thereby the upper platen 18, can be adjusted vertically by turning of the adjustment nuts 33. If it is desired to raise the plate 26 it will be necessary initially to lower the plate 26 until certain of the shims have been removed, after which plate 26 can be raised the desired amount. Thus, where relatively large changes are desired in the spacing between the platens 16 and 18, this can be readily accomplished by varying the position of the upper platen 18 in the manner described.

Figure 5:
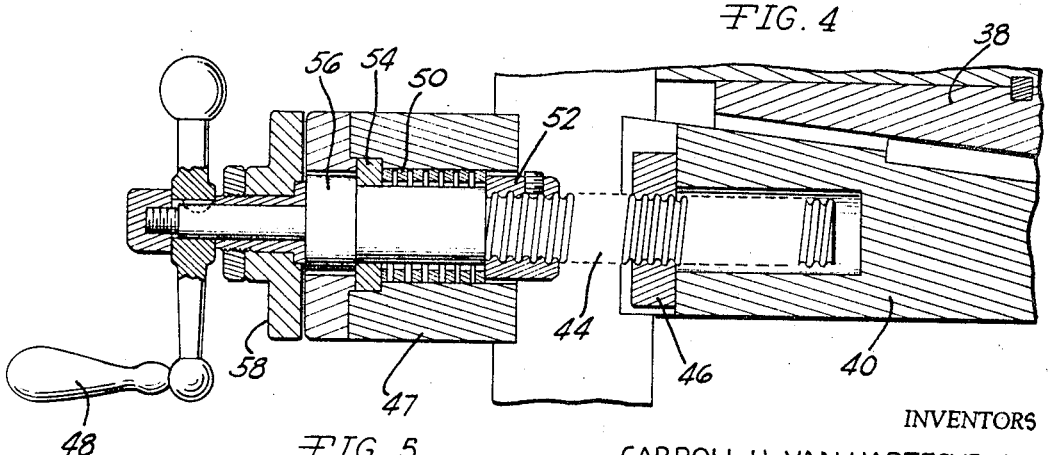
FIGURE 5 is an enlarged fragmentary sectional view illustrating a detail of construction of the spacing mechanism illustrated in FIGURE 4 for adjusting the spacing between the platens.

When it is desired to make small but accurate changes in the spacing between the platens 16 and 18, a fine adjustment means is provided in the vernier adjustment mechanism 34, shown best in FIGURES 4 and 5. As there shown, the lower platen 16 is connected to the plate 36 which is keyed against lateral movement to the upper wedge block 38. A lower wedge block 40 is mounted on the stationary frame member 42 for lateral movement with respect to the frame member 42 and also with respect to the upper wedge block 38. As shown in FIGURE 5, the lower wedge block 40 is keyed to the upper wedge block 38 for movement in this direction. Lateral movement of the wedge block 40 is provided by the screw 44 which is threadedly connected to the block 46 which is integrally secured to the lower wedge block 40. The screw 44 is adapted to turn in the bore of the rigid frame member 47. Such turning can be achieved merely by turning the crank handle 48 which is secured to the end of the shaft 44 in a conventional manner. As is also shown in FIGURE 5, the shaft 44 is frictionally held in place against free turning by means of a compression spring 50 which is disposed between the nut 52, which is secured to the shaft 44, and the ring 54 which is seated on an annular shoulder of the stationary frame member 47. The action of the spring 50 urges the nut 52 in a direction so that the collar 56 on the shaft 44 is frictionally urged into engagement with the ring 54. Suitable vernier readings are provided on the face of the plate 58 to permit accurate settings of the lower platen 16 relative to the upper platen 18.

Referring again to FIGURES 1 and 2, it will be observed that a first belt or sheet 60 is arranged to move longitudinally across the upper surface of the lower platen 16, and a second belt or sheet 62 is arranged to move longitudinally across the lower surface of the upper platen 18. By virtue of this arrangement, a workpiece can be sandwiched in between the belts 60 and 62 and can be pulled between the opposite surface of the platens 16 and 18 in a manner to be described.

Figure 3:
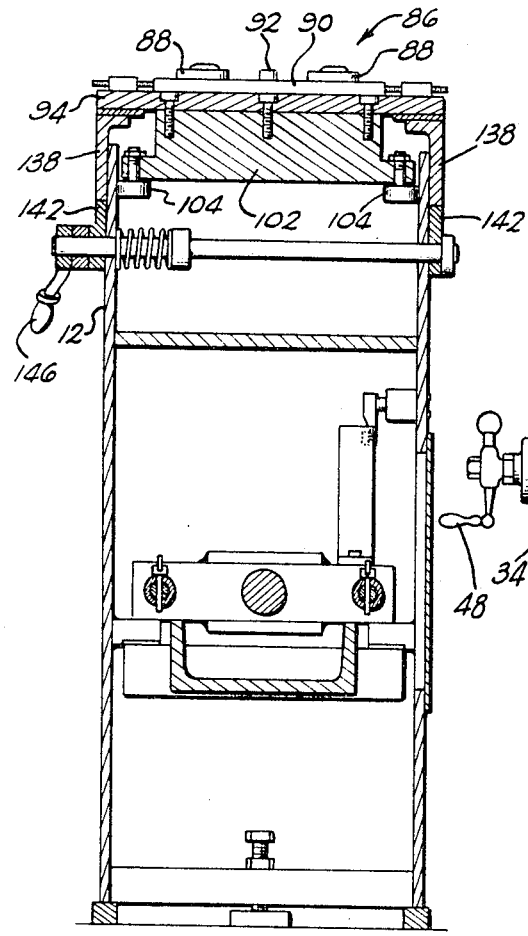
FIGURE 3 is a vertical sectional view taken on the lines 3—3 of FIGURE 2.

Supported within the frame 12 for moving the belts 60 and 62 toward one end of the test press 19 is a hydraulic cylinder-and-ram or piston assembly 64. The cylinder 66 is supported in a stationary position and the ram 68 is adapted to reciprocate in response to hydraulic fluids supplied from the pump 70 which in turn is driven by the electric motor 72. The ram 68 is shown in its extended position in FIGURE 1, and it supports at its free end a cross bar 74. Mounted on the cross bar 74 is a pulley 76 around which is fitted a cable 78. The two ends of the cable 78 which extend from the pulley 76 then pass around a pair of pulley wheels 80 and 82 which are mounted on shaft 84 which is supported on the one end of frame 12. The cables 78 are then connected to a mechanism 86 which is operable to assure alignment of the sheets or belts 60 and 62 in the direction of the pull of the cables 78, and this mechanism also functions to assure that the belts 60 and 62 will be tensioned substantially equally across their widths during pulling operations by the hydraulic piston-and-ram assembly 64. Each end of the cables 78 is attached to a clevis 88 which in turn is pivotally connected to a pivot plate 90. The latter is pivotally connected by a pin 92 to the draw plate 94. The draw plate 94 is adapted to be connected to the belts 60 and 62 in the manner best shown in FIGURES 6 and 7. As there shown, the belt 62 is wrapped around a cross bar 96 and another bar 98 is placed across the free end of the belt 62 after which a plurality of screws 100 are passed through the bars 96 and 98 and are secured to the spacer bar 99. The spacer bar 99 is secured to the draw plate 94 by bolts 103. The belt 62 is secured in the folded position by the set screws 101. The belt 60 is connected to the draw plate 94 by a similar arrangement of parts located on the under side of the draw plate 94. The draw plate 94 is secured on its under side also to a carriage 102 on which are mounted a pair of rollers 104, see FIGURES 3 or 9, which are positioned so that they can travel on the inner walls of the stationary frame structure 12. Similarly, the pivot plate 90 is secured on its under side to a carriage 105, FIGURE 8, on which are mounted a pair of rollers 106, also adapted to travel on the inner walls of frame structure 12.

By virtue of this arrangement described for connecting the hydraulic ram-and-cylinder assembly 64 to the ends of the belts 60 and 62, the tension on the two ends of the cable 78 will always be equal by virtue of the action of pulley 76 which will always rotate to equalize the pulling action of the two ends of the cable 78. Also, if the ends of the belts 60 and 62 have not been properly oriented on the draw plate 94 when securing the belts thereto, the draw plate 94 initially during the securing operation is free to pivot relative to the pivot plate 90 by virtue of the pivotal connection at 92. The set screws 107 which are mounted on draw plate 94 can then be used to adjust draw plate 94 relative to pivot place 90 about the pivot at 92. These screws will also lock the two plates together in the adjusted position and additionally, the lock screw 108 can also be tightened after alignment to accomplish the desired locking action. It will be noted in FIGURE 6 that lock screw 108 is in an arcuate slot, permitting the adjustment of plates 90 and 94 when set screws 107 and lock screw 108 are loose. Thus, when the cables ends 78 are pulled on the pivot plate 90, the draw plate 94 can always be oriented in such a manner that the direction of pull of the cables will extend in a line passing generally through the longitudinal axis of the belts 60 and 62. From the foregoing description, it will be clear that when it is desired to pull the belts 60 and 62 across the surfaces of the platens 16 and 18 with a workpiece sandwiched therebetween, this can readily be accomplished by actuating the hydraulic cylinder-and-ram assembly 64 so that the ram 68 travels to the right, as seen in FIGURE 1, pulling the bar 74 in the same direction, and thereby advancing the ends of the belts 60 and 62 to the left, as seen in FIGURE 1.

For the purpose of returning the belt 60 to the starting position shown in FIGURE 1, a pair of cables 109 are operatively connected between the bar 74 and the other end of the belt 60. Only one of these cables 109 and its associated parts will be described, because both of the cable arrangements are constructed the same. The cable 109 has a clevis 110 at its one end which is connected to a hollow tube 111 in which are a series of axially arranged apertures 112. A rod 114 extends axially into the hollow tube 111, and it has an eyelet at its forward end (not shown) through which a pin 116 can be passed which has been inserted through one of the apertures 112. By virtue of this arrangement the effective length of the cable 109 may selectively be varied. The rod 114 has a head 118 at its one end and a compression spring 120 is held between the head 118 and the bar 74 so that the spring can function as a cushioning member. The cable 109 passes over a pair of pulleys 122 and 124 and then is attached to the other end of the belt 60. Thus, after the belt 60 has been pulled across the surface of the platen 16 to a position near the left end of the test press 10, it can readily be returned to the position shown in FIGURE 1 merely by reversing the direction of action of the hydraulic piston-and-cylinder assembly 64. For the purpose of automatically interrupting travel of the hydraulic ram in moving the belt 60 in either direction, limit switches are provided. A limit switch 126 is positioned to interrupt movement of the ram when returning to its starting position, and a limit swtich 128 is mounted so as to be engaged by the element 130 on cable 109 to limit movement of the hydraulic ram in the opposite direction of travel.

It will be noted that the hydraulic cylinder-and-ram assembly 64 is not arranged so as to return the belt 62 to its original position. Instead, the belt 62 is connected at its one end to a cable 131 which is suitably connected to a weight 132 by means of the pulley assembly 134 so that the belt 62 is constantly urged to its original starting position. This arrangement is provided so that after the belts 60 and 62 have been pulled between the platens 16 and 18 with a workpiece sandwiched therebetween, the upper belt can be pulled further through the space between the platens to enable the operator to remove a workpiece from between the belts, and thereafter when the belt is again released it will be returned to its position wherein it is being urged to its starting position.

For the purpose of feeding the workpiece between the belts, a table top 136 may be slidably moved into general alignment with the opening between the platens 16 and 18, and a workpiece may be fed between the moving belts from this position of the table top.

It will also be recognized that when the opening between the platens 16 and 18 is varied, such as by changing the shims 32, it may be desired to vary the vertical position of the ends of the belts 60 and 62 on the left side of the platen assembly as viewed in FIGURE 1. For this purpose a pair of pivotal tracks 138 are provided on which the draw plate 94 is adapted to travel. The tracks 138 are pivotally mounted on one end of the pins 140 and are supported at the other end on the cams 142 which are adapted to be rotated on the shaft 144 by means of the handle 146. By virtue of this arrangement, the end of the tracks 138 adjacent to the outlet opening between the platens 16 and 18 can be vertically adjusted merely by rotating the cam 142.

As previously indicated, limit switches 126 and 128 are provided to prevent inadvertent traveling of the belts 60 and 62 beyond their normal limits of movement. In addition, manual switch means are also provided at 148 to enable the operator to start, stop and return the belts to the position shown in FIGURE 1. A control panel 150 is provided for indicating the temperatures, rate of speed of travel of the belts, and other operating parameters that are to be determined, and these controls will not be described in detail, but it is to be understood that they permit the operator to simulate any condition that is desired to aid the operator in determining proper operating conditions of the test machine 10 and thereby of the larger continuous presses in connection with which the test machine may be operated.

From the foregoing description it will be understood that a relatively simple machine has been described in comparison with the large continuous presses of the type illustrated and described in the aforesaid United States Letters Patent Nos. 3,207,062 and 3,206,009, and that test samples can quickly be passed through the test press 10 to determine desired operating conditions for the larger continuous presses. Also, it can be readily seen, that belts 60 and 62 are relatively short and narrow in width, and they can easily be constructed out of scrap remains from large continuous belts of the type employed in the larger machines, thereby making such belts relatively expendable so that they may be freely used in conducting various tests to determine the extent of damage that may occur to belts in connection with forming a variety of different workpieces.

While the machine embodying the present invention has been referred to as a "test" machine for use with large continuous presses, it is to be understood that it can also be used in an independent manner as a relatively lower cost machine of lower capacity.

Having thus described our invention, we claim:

1. In a machine for forming workpieces in sheet form, first and second platens having opposed surfaces in spaced apart relation, frame means supporting said platens in stationary operative positions, first and second sheets having a high tensile strength positioned to move in sliding engagement across the surfaces respectively of said first and second platens when said platens are in their operative positions, means connected to the leading ends of both sheets for pulling said sheets as a unit from a starting position slidingly across the surfaces of the platens in one direction of travel with a workpiece sandwiched in between said sheets, means for interrupting movement of said sheets in said one direction, and means for pulling said sheets in the opposite direction of travel back to said starting position.

2. In a machine for forming workpieces in sheet form according to claim 1, wherein, at least, one of said opposed surfaces includes in longitudinal arrangement a first flat surface, a second flat surface parallel to said first flat surface and a compression surface inclined inwardly from said first to said second flat surface.

3. In a machine for forming workpieces in sheet form according to claim 1, wherein said means for pulling said sheets in one direction includes controls for selectively changing the rate of movement of said sheets.

4. In a machine for forming workpieces in sheet form according to claim 1, wherein said platens contain heating elements, and means are provided for selectively changing the temperature of said heating elements.

5. In a machine for forming workpieces in sheet form according to claim 1, wherein means are provided for selectively changing the magnitude of spacing between said platens.

6. In a machine for forming workpieces in sheet form according to claim 1, wherein means are provided for selectively changing relative to the surfaces of said platens the planes in which said first and second sheets are pulled.

7. In a machine for forming workpieces in sheet form according to claim 1, wherein means are provided to align longitudinally said sheets and said means for pulling said sheets in said one direction so that said sheets are uniformly tensioned across their widths during pulling operations.

8. In a machine for forming workpieces in sheet form according to claim 1, wherein the means for pulling said sheets in one direction of travel is connected to the other end of said first sheet for pulling said first sheet in the opposite direction of travel.

9. In a machine for forming workpieces in sheet form according to claim 1, wherein the means for pulling said second sheet in the opposite direction of travel includes a mechanism for constantly urging said sheet in the opposite direction at a relatively low magnitude to permit manual flexing of said second sheet to facilitate handling of a workpiece positioned in between said first and second sheets.

10. In a machine for forming workpieces in sheet form according to claim 1, wherein said means for pulling said sheets in one direction is extensible so that sheets of different lengths can be used in said machine.

11. In a machine for forming workpieces in sheet form, an elongated frame structure supporting at a location between its ends first and second platens having opposed surfaces in spaced apart relation, first and second metallic sheets having a high tensile strength extending in a longitudinal direction of said frame structure and positioned to move in sliding enegagement across the surfaces respectively of said first and second platens, means movable longitudinally of said frame structure and connected to the leading ends of said sheets for pulling said sheets as a unit in one direction toward one end of said frame structure with a workpiece sandwiched in between said sheets, said means being connected to the leading end of each of said sheets by a mechanism operable to assure alignment of the sheets with the direction of pull of said means and operable to tension said sheets substantially equally across the widths of said sheets, and means for pulling the other ends of said sheets in the other direction toward the other end of said frame structure.

12. In a machine for forming workpieces in sheet form, an elongated frame structure supporting at a location between its ends first and second platens having opposed surfaces in spaced apart relation, first and second belts having a high tensile strength extending in a longitudinal direction of said frame structure and positioned to move over the surfaces respectively of said first and second platens, means for pulling said belts in one direction toward one end of said frame structure with a workpiece sandwiched in between said belts, said means being connected to one end of each of said belts by a mechanism operable to assure alignment of the belts with the direction of pull of said means and operable to tension said belts substantially equally across the widths of said belts, and means pulling the other ends of said belts in the other direction toward the other end of said frame structure, said first-named means comprising an hydraulic piston-and-cylinder assembly extensible lengthwise of said frame and said mechanism which is connected to the extensible portion of said piston-and-cylinder assembly and to said one end of each of said belts.

13. In a machine according to claim 12, wherein the second-named means includes a first mechanism connected to the extensible portion of said piston-and-cylinder assembly and to the other end of the first of said belts.

14. In a machine according to claim 12, wherein the second-named means includes a second mechanism connected to the other end of the second of said belts, said second mechanism continuously urging said second belt toward said other end of said frame structure.

15. In a machine according to claim 11, wherein limit means are provided for limiting the extent of travel of said sheets in both directions.

16. In a machine according to claim 11, wherein workpiece feed means are slidably supported on said frame structure adjacent to the other ends of said sheets for manually feeding a workpiece in between the sheets when the sheets are being pulled in said one direction.

References Cited

UNITED STATES PATENTS

| | | | |
|---|---|---|---|
| 1,925,866 | 9/1933 | Drake | 100—47 |
| 2,364,616 | 12/1944 | Boeddinghavs | 100—222 X |
| 3,159,526 | 12/1964 | Van Hartesveldt et al. | 100—93 X |
| 3,206,009 | 9/1965 | Wahl | 100—93 X |
| 3,207,062 | 9/1965 | Van Hartesveldt et al. | 100—93 |
| 3,263,460 | 8/1966 | Kabelitz et al. | 100—47 X |

PETER FELDMAN, *Primary Examiner.*

U.S. Cl. X.R.

100—144, 177, 222, 224